United States Patent [19]

Barnes

[11] Patent Number: 5,075,016

[45] Date of Patent: Dec. 24, 1991

[54] METHOD FOR TREATING RECIRCULATING WATER

[76] Inventor: Ronald L. Barnes, 303 Drury La., Huntsville, Ala. 35802

[21] Appl. No.: 259,525

[22] Filed: Oct. 17, 1988

Related U.S. Application Data

[63] Continuation of Ser. No. 670,634, Nov. 13, 1984, abandoned.

[51] Int. Cl.$^5$ ................................................ C02F 1/78
[52] U.S. Cl. ..................................... 210/760; 210/765
[58] Field of Search ............... 210/760, 764, 765, 766, 210/167, 169, 170, 177, 181, 182, 184, 186, 192, 194, 196, 201, 202, 205, 258, 295

[56] References Cited

U.S. PATENT DOCUMENTS

| | | | |
|---|---|---|---|
| 3,326,747 | 6/1967 | Ryan et al. | 210/760 X |
| 4,053,403 | 10/1977 | Bachhofer et al. | 210/760 X |
| 4,172,786 | 10/1979 | Frosch et al. | 210/760 X |
| 4,255,257 | 3/1981 | Greiner et al. | 210/760 X |

Primary Examiner—Thomas Wyse
Attorney, Agent, or Firm—Donald P. Gillette

[57] ABSTRACT

This invention concerns a method of treating water from a container with ozone. The water is withdrawn from the container in a main stream, then passed through a pressure-reducing means, and returned to the container. A part of the main recirculating stream is separated into a second stream. The second stream is treated with ozone and held for a sufficient period of time to allow substantially all of the ozone to permeate into the water. The second stream is then re-introduced into the main stream or directly into the container.

4 Claims, 2 Drawing Sheets

METHOD FOR TREATING RECIRCULATING WATER

This is a continuation of application Ser. No. 670,634, filed Nov. 13, 1984, now abandoned.

BACKGROUND OF THE INVENTION

This invention relates to a system for withdrawing water from a container such as a hot tub or swimming pool, forcing the water to separate into two paths, treating the water in one path differently from the way the water in the other path is treated, and returning the treated water from both paths to the container. In particular, the invention pertains to such a system in which the water moving along one of the paths passes through a filter to remove certain contaminants and the water moving along the other path goes through a venturi that has a side opening through which a gas containing ozone is supplied to that water. After passing through the venturi, the water in the latter path passes through a water line of sufficient length to hold the bubbles entrained in the water a sufficient time to allow the ozone in the gas to permeate into the water before the water returns to the container.

Systems for treating water from a hot tub normally withdraw the water through one or more drains in the bottom and side of the tub into a loop which includes a pump that moves the water, and a filter which removes some contaminants from the water. It is also common practice to include a heater in the loop between the filter and the nozzle or nozzles and through which the water passes as it returns to the tub. People using hot tubs also like to have bubbles included in the water that reenters the tub, and this can be accomplished by forcing the water through a venturi that has a side port through which air can be drawn into the stream of water by the reduced pressure in the venturi.

As a further improvement in the treatment system, instead of plain air, a source of gas that includes ozone may be connected to the port. The gas may be air with part of its oxygen converted into ozone. Ozone has a very beneficial effect in purifying the water. Some of this effect is due to chemical transformation of some of the contaminants into a form suitable to be captured by the filter. However, in order to act chemically on the contaminants, the ozone, which enters the stream of water as part of the gas in bubbles, must permeate the wall of water that surrounds and defines each bubble. Fortunately, ozone does permeate into the water more easily than do other components of air (the gas normally used in such treatment systems), but the permeation takes a little while, and the bubbles must not be able to reach the water-air interface at the surface of the water in the container before the permeation is at least substantially complete. In order to be sure that the bubbles are retained long enough, the venturi is separated from the container by a water line several feet long.

It is not always easy or even possible to arrange all of the required components, including water line lengths, in the required relationship in sequence and to keep all of them operating in an optimum or even satisfactory manner.

OBJECTS AND SUMMARY OF THE INVENTION

It is one of the objects of the invention to provide better control of the operation of water treatment components in a recirculation system for use with a hot tub or swimming pool or the like.

Another object is to provide ample water flow through a venturi in a recirculation system independently of the condition of flow through the filter in the system.

Further objects will be apparent from the following written description and the accompanying drawings.

In accordance with the invention, water recirculated from a container through treatment components and back into the container is forced along the recirculation path by a single pump, but part of the path is separated into two branches, one of which includes a filter that removes or traps certain contaminants that are in the water. Instead of connecting a venturi in the same branch as the filter to draw gas into that branch, the venturi is connected in the other branch and is followed by a sufficient length of line to provide good mixing of the ozone and the water.

DETAILED DESCRIPTION OF A PREFERRED EMBODIMENT OF THE INVENTION

Figure 1:
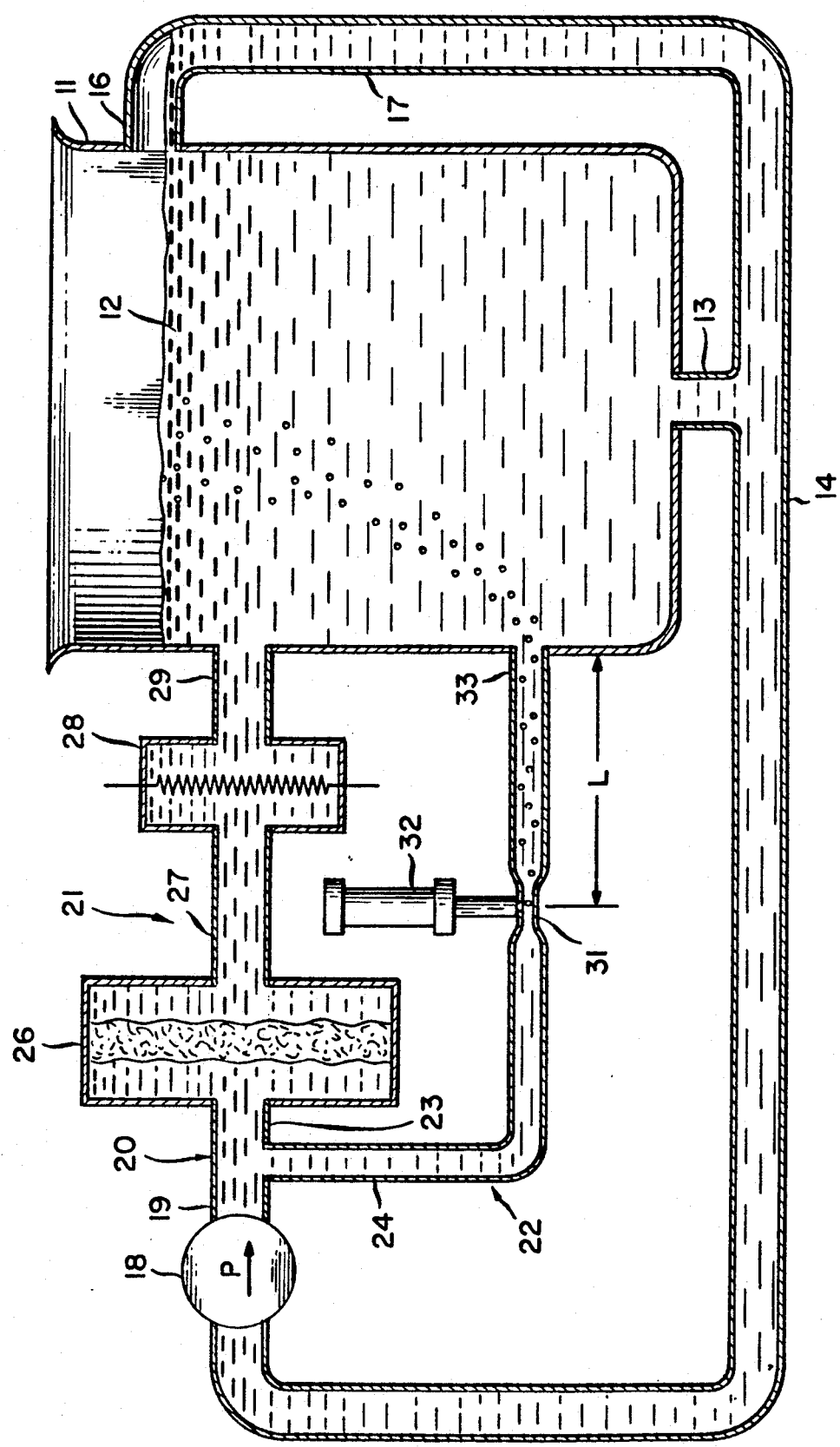
FIG. 1 is a schematic representation of a container of water and a recirculation and treatment system according to this invention.

The system in FIG. 1 includes a container 11, such as a hot tub or a swimming pool, that holds a quantity of water 12. The container has a bottom drain 13 through which the water flows into a main recirculating water line 14. The container in this embodiment also has one or more side drains, such as the drain 16 at the level of the surface of the water 12. Each side drain is also connected by a pipe, or line, 17 to the main recirculating line 14.

Water in the main recirculating line 14 is forcibly drawn into a water pump 18 from which it is forcibly ejected into another section 19 of the main recirculating line 14. The latter section includes a Tee 20 that divides the main recirculating line into two branches 21 and 22. The Tee may be as close as desired to the pump. In fact, it may even be replaced by a structure inside the pump 18 that provides two water outlets from the pump. Further, the Tee may be simply considered as a point at which one of the branches is diverted from the main stream. Ideally, the combined sizes of the right-hand and vertical lines 23 and 24, respectively, in the Tee 20 are equal to that of the left-hand line 19 as it emerges from the pump 18.

The branch 21 that begins with the line 23 is connected to a filter 26 of a type commonly used in conjunction with the container 11 to filter contaminants from the water 12. Again, it is not necessary that there be any specific length between the Tee 20 and the filter 26. The filtering element or elements in the filter may be any of those commonly used, such as sand, diatomaceous earth, paper, etc. However, no matter what type of element is used, there will always be a loss of pressure between the water that enters from the line 23, essentially at the output pressure of the pump 18, and the water that emerges from the output connection 27 of the filter. Typically, there may be a pressure drop of 15 p.s.i. across the filter.

Another component commonly used, especially in conjunction with hot tubs, is a heater 28. Many of such heaters use electric power to supply the heat; others are gas-fired. In any case, there will also be a drop in pressure between water at the output connection 27 of the filter 26 and water supplied from the heater 28 to a nozzle, or nozzles, 29 at the container 11. The pressure of water emerging from the nozzle 29 must be great enough so that the water will reenter the container with some force. In hot tubs it is considered desirable and even essential that the water from the nozzle have a very perceptible force, while in the case of swimming pools, it frequently is arranged to spray upwardly from a fountain.

The total pressure drop through the branch 21, which includes the filter 26 and the heater 28, is so large that, unless the pump 18 is quite powerful, there will not be enough pressure to insert a venturi in this branch. In addition, any clogging of the filter will further reduce the pressure in the branch 21.

In accordance with the present invention, a venturi 31 is connected in the line 24, which may be considered a secondary line. A source 32 of gas that includes ozone is connected to a port in the throat of the venturi to inject gas. The gas may simply be the atmosphere and the source 32 may be a device through which the air is drawn and within which there is an ultraviolet light source that causes some of the $O_2$ molecular oxygen to be transformed into $O_3$ ozone.

The gas thus connected to the venturi is drawn in by the reduced pressure of water in the venturi and produces bubbles in that water. The ozone fraction of the gas can, in a little while, permeate the water wall that surrounds and defines each bubble and be absorbed into the water. The ozone thus absorbed is able to combine chemically with metal ions and to attack organic matter so that the oxidized metal and the remnants of the organic matter can be trapped by the filter 26.

However, the trapping cannot take place until the water treated by the ozone has passed at least once more through the main recirculating line 14 and into the filter. In fact a given oxidized metal ion or a given viral, bacterial or other organic cell that has been attacked by the ozone may not reach the filter 26 until it has gone through the venturi 31 more than once. Conversely, a given particle, organic or inorganic, may not traverse the branch 22 until it has gone one or more times through the filter 26. Either case is acceptable, because, even if the filter and the ozone supply were in the same branch, it is entirely possible that some particles would not receive any ozone on a given pass through the venturi and, among those that did, some would pass through the filter without being trapped.

In order to operate successfully, the venturi 31 must not only have a substantial pressure drop across it, but the water with gas bubbles must be contained long enough to allow the ozone fraction to be absorbed. By connecting the input end of the line 24 very close to the pump 18 and the output end to a nozzle, or nozzles, 33 in the container 11, there will be a sufficient pressure drop across the venturi. Furthermore, water can flow through the branch 22 even if the filter 26 or some other part of the branch 21 clogs up. The water with gas bubbles is contained long enough by making the length L of that portion of the line 24 between the venturi 31 and the nozzle 33 long enough so that the length of time required for water to transverse it will be great enough to allow absorption of the ozone. Typically a length L of about four feet to ten feet will be sufficient.

Figure 2:
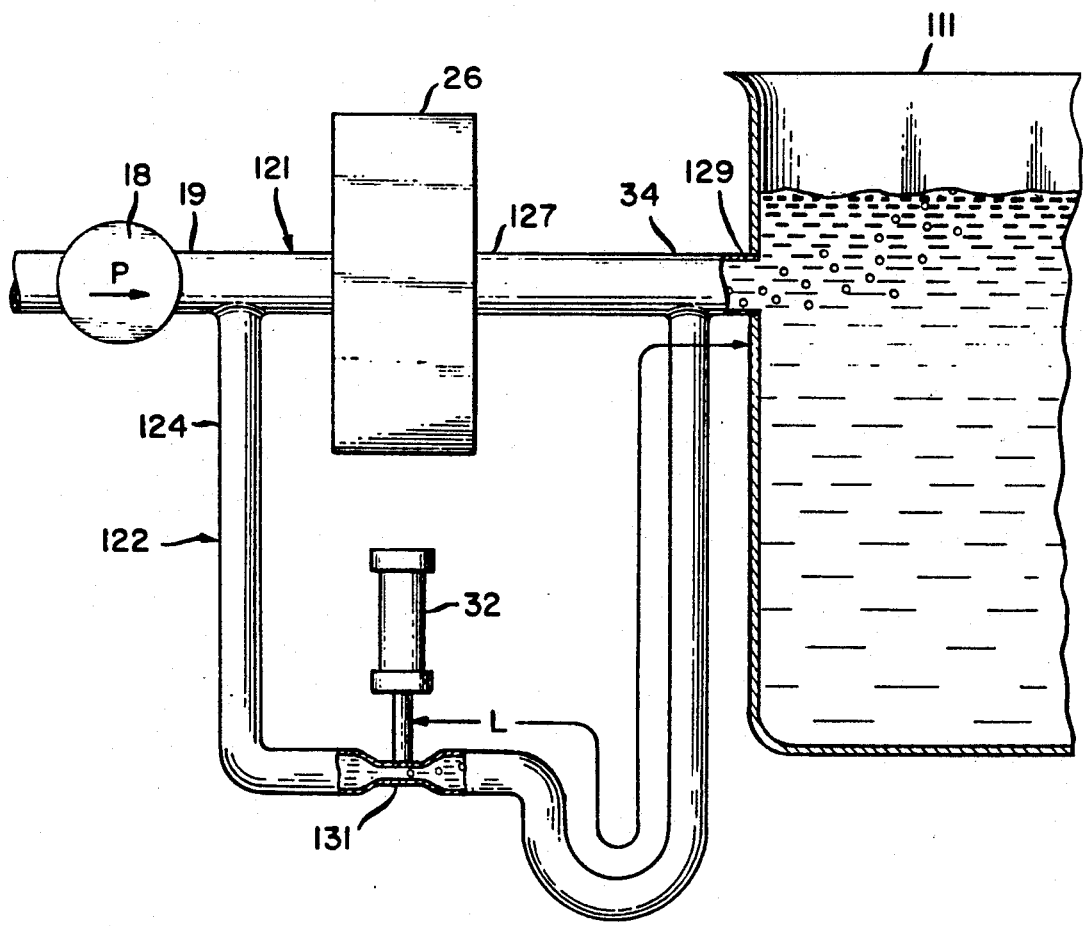
FIG. 2 is a schematic representation of a modified fragment of a recirculation system according to this invention.

In FIG. 1, the diameter of the line 24 is about the same as, or may be greater than, the diameter of the sections of line in the branch 21. In FIG. 2, on the other hand, the components are somewhat different, although the principle of operation is the same.

The main line section 19 is connected to a Tee 120 where it divides into first and second branches 121 and 122. The branch 121 includes the filter 26 but has no heater. Heat, if desired, may be supplied elsewhere.

A line 124 of smaller diameter than the line sections 123 and 127 making up the branch 121 is used in the branch 122. As before, a venturi 131 supplied with ozone-enriched gas from the source 32 is connected in the line 124.

Unlike the system in FIG. 1, the line 124 in FIG. 2 is not connected to a separate nozzle but is connected to the line 127 leading to the nozzle 129. This eliminates a second nozzle and incorporates gas bubbles in the water emerging from the nozzle 129. The inclusion of gas bubbles in the water returned to a hot tub is considered to be very desirable. However, as in FIG. 1, the container 111 may be a swimming pool as well as a hot tub. The length L of the line between the venturi 131 and the container 111 must be great enough to allow the ozone to permeate the wall of water around each bubble and be absorbed in the water, and a length L of about four to ten feet will be sufficient. However, that length includes some part of the line 127 between a second Tee 34 and the nozzle 129. The length of that part may be negligible, but it may also be significant.

While the invention has been described in specific terms, it will be understood that modifications may be made therein. For example, the heater 28 in FIG. 1 may be used in the system in FIG. 2, and the thin line 124 in FIG. 2 may be substituted for the line 24 in FIG. 1. These are only two of the many modifications that may be made.

What is claimed is:

1. In the method of treating water from a container by withdrawing a main stream of water from the container, applying pressure to the stream, passing the stream through pressure-reducing means, and returning the water to the container, the invention comprising the steps of:
   (a) separating a part of the water to a second stream while allowing the remainder of the water in the main stream to return to the container;
   (b) treating the water in the second stream by introducing an ozone-containing medium into the second stream to produce ozone-containing bubbles therein;
   (c) holding the treated water in the second stream separate from the main stream for a sufficient period of time after the ozone-containing medium has been introduced therein to allow substantially all of the ozone from the bubbles to permeate into the water in the second stream to purify the water in the second stream substantially completely before the bubbles reach the surface of the water in the container; and
   (d) repeating the steps of separating a part of the water, introducing an ozone-containing medium into the second stream to produce ozone-containing bubbles therein, and holding the treated water in the second stream separate from the main stream for a period of time sufficient to allow substantially all of the ozone from the bubbles to permeate into the water in the second stream to purify the water in the second stream substantially completely before the bubbles reach the surface of the water in the container, said repeated steps being repeated until substantially all of the water in the container is substantially completely purified.

2. The invention of claim 1 comprising the step of remixing the substantially completely purified water in the second stream with the remainder of the water in the main stream before the remainder of the water in the main stream reaches the container.

3. The invention of claim 1 comprising the step of directing the substantially completely purified water in the second stream into the container separately from the remainder of the water in the main stream.

4. The invention of claim 1 in which the medium is an ozone-containing gas, said invention comprising the further step of reducing the pressure of the water in the second stream at a predetermined location along its length to draw the ozone-containing gas into the second stream to form the ozone-containing bubbles in the second stream.

* * * * *